United States Patent
McLaughlin

(10) Patent No.: US 11,161,092 B2
(45) Date of Patent: Nov. 2, 2021

(54) METHOD OF INCREASING ADSORPTION IN BIOCHAR BY CONTROLLED OXIDATION

(71) Applicant: Hugh McLaughlin, Groton, MA (US)

(72) Inventor: Hugh McLaughlin, Groton, MA (US)

( * ) Notice: Subject to any disclaimer, the term of this patent is extended or adjusted under 35 U.S.C. 154(b) by 0 days.

(21) Appl. No.: 15/075,182

(22) Filed: Mar. 20, 2016

(65) Prior Publication Data

US 2016/0199811 A1 Jul. 14, 2016

Related U.S. Application Data

(63) Continuation of application No. PCT/US2014/056724, filed on Sep. 22, 2014.

(60) Provisional application No. 61/882,241, filed on Sep. 25, 2013.

(51) Int. Cl.
*B01J 20/20* (2006.01)
*B01J 20/30* (2006.01)
*C01B 32/336* (2017.01)
*C10L 5/44* (2006.01)

(52) U.S. Cl.
CPC ........... *B01J 20/3085* (2013.01); *B01J 20/20* (2013.01); *B01J 20/3078* (2013.01); *C01B 32/336* (2017.08); *C10L 5/442* (2013.01); *Y02E 50/10* (2013.01); *Y02E 50/30* (2013.01)

(58) Field of Classification Search
CPC ............................... B01J 20/20; C01B 32/336
See application file for complete search history.

(56) References Cited

U.S. PATENT DOCUMENTS

| | | | |
|---|---|---|---|
| 3,884,830 A * | 5/1975 | Grant | C07C 51/47 502/429 |
| 4,419,185 A | 12/1983 | Bowen et al. | |
| 4,497,637 A | 2/1985 | Purdy et al. | |
| 6,310,000 B1 * | 10/2001 | Matviya | B01J 21/18 423/445 R |
| 6,863,004 B1 | 3/2005 | Randall | |
| 8,226,798 B2 | 7/2012 | van Aardt et al. | |
| 8,361,186 B1 | 1/2013 | Shearer et al. | |
| 8,398,738 B2 | 3/2013 | Lee et al. | |
| 9,005,402 B2 * | 4/2015 | Del Monte | C10B 7/10 201/32 |
| 9,505,984 B2 * | 11/2016 | Mulqueen | C05D 9/00 |

FOREIGN PATENT DOCUMENTS

WO WO 2013/123529 A1 8/2013

OTHER PUBLICATIONS

The International Preliminary Report on Patentability dated Mar. 29, 2016 for Corresponding PCT Application No. PCT/US2014/056724.

The International Sercah Report and Written Opinion of the International Searching Authory dated Dec. 30, 2014 for Corresponding Application No. PCT/US2014/056724.

Office Action issued by the European Patent Office dated Feb. 24, 2017 for related EP Application No. 14848652.5.

Ould-Idriss A., et al: "Preparation of activated carbons from olive-tree wood revisited. II. Physical activation with air". Fuel Processing Technology, Elseiver BV, NL, vol. 92, No. 2, Feb. 1, 2011 (Feb. 1, 2011), pp. 266-270, XP027572764, ISSN: 0378-3820 [retrieved on Jul. 1, 2010].

Angel Linares-Solano, et al: "Active carbons from almond shells as adsorbents in gas and liquid phases", Journal of Chemical Technology and Biotechnology, vol. 30, No. 1, Jan. 1, 1980 (Jan. 1, 1980), pp. 65-72, XP055345616, ISSN: 0142-0356, DOI: 10.1002/jctb.503300109.

Ganan J, et al: "Air-activated carbons from almond tree pruning: Preparation and characterization", Applied Surface Ceience, Elseivier, Amsterdam, NL, vol. 252, No. 17, Jun. 30, 2006 (Jun. 30, 2006), pp. 5988-5992, XP024893068, ISSN: 0169-4332, DOI: 10.1016/J.APSUSC.2005.11.024 [retrieved on Jun. 30, 2006.

Hugh McLaughlin, et al: "All Biochars are Not Created Equal, and How to Tell Them Apart", Oct. 1, 2009 (Oct. 1, 2009), XP055345357, Retrieved from the Internet: URL:http://www.acfox.com/AllBiocharsV2Oct09.pdf [retrieved on Feb. 14, 2017].

(Continued)

*Primary Examiner* — Stuart L Hendrickson
(74) *Attorney, Agent, or Firm* — Brian M. Dingman; Dingman IP Law, PC

(57) ABSTRACT

Methods of improving the adsorption capacity of biochar (14). Initial biochar (14) is charged in a closed vessel (12). The biochar (14) is then exposed to a processing temperature and oxygen level below that of vapor space luminous combustion, and at the same time the oxygen level in a vapor space surrounding the biochar (14) is controlled, so as to promote oxidation reactions that generate additional heat. The biochar (14) is held at the processing temperature by removal of heat by conduction through the vessel (12) walls, uptake of specific heat by solids and vapors in the vessel (12), and the endothermic requirements of converting any biomass present in the vessel (12) into char. The biochar (14) is maintained at the processing temperature and oxygen level for sufficient duration such that the adsorption capacity of the final biochar (14) is improved, as measured by ASTM D-5742 or the equilibrium uptake of R134a at 100 degrees Celsius.

17 Claims, 2 Drawing Sheets

(56) References Cited

OTHER PUBLICATIONS

Hugh McLaughlin, et al: "Schenkel and Shenxue revisited—implications on char production and biochar properties", issued at the Biochar2010 Conference, Jun. 1, 2010 (Jun. 1, 2010), XP055345331, Retrieved from the Internet: URL:HTTP://pvbiochar.org/forum.index.php?topic=2878.0 [retrieved on Feb. 14, 2017].

Hugh McLaughlin, et al: "Appendices—A to E—Schenkel and Shenxue revisited—implications on char production and biochar properties", Version, Jun. 1, 2010 (Jun. 1, 2010), XP055345336, Retrieved from the Internet: URL:http//www.acfox.com/AppAtoE.pdf [retrieved on Feb. 14, 2017].

\* cited by examiner

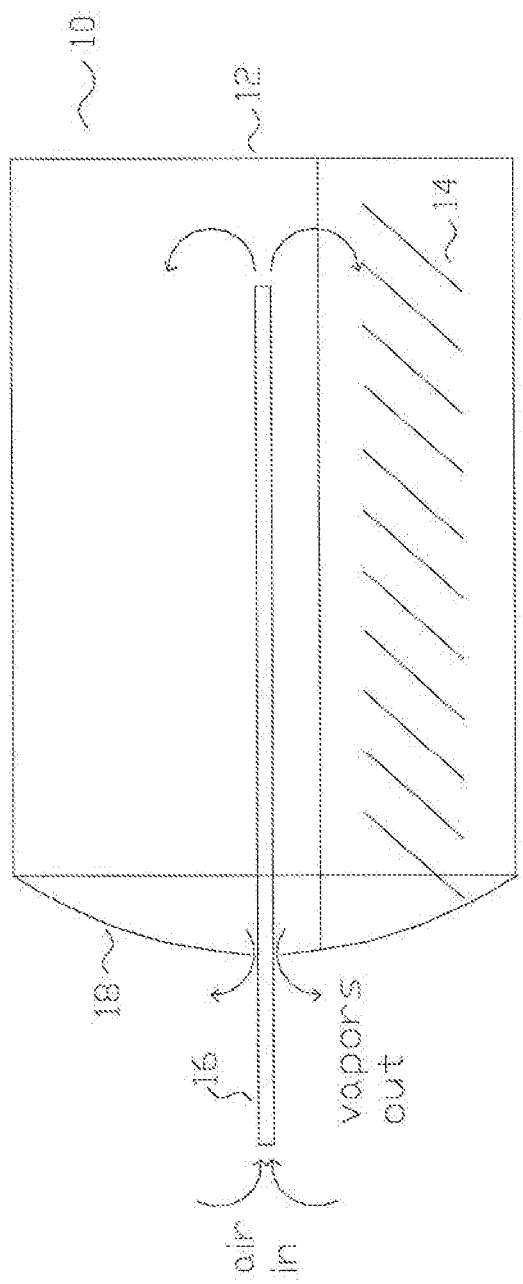

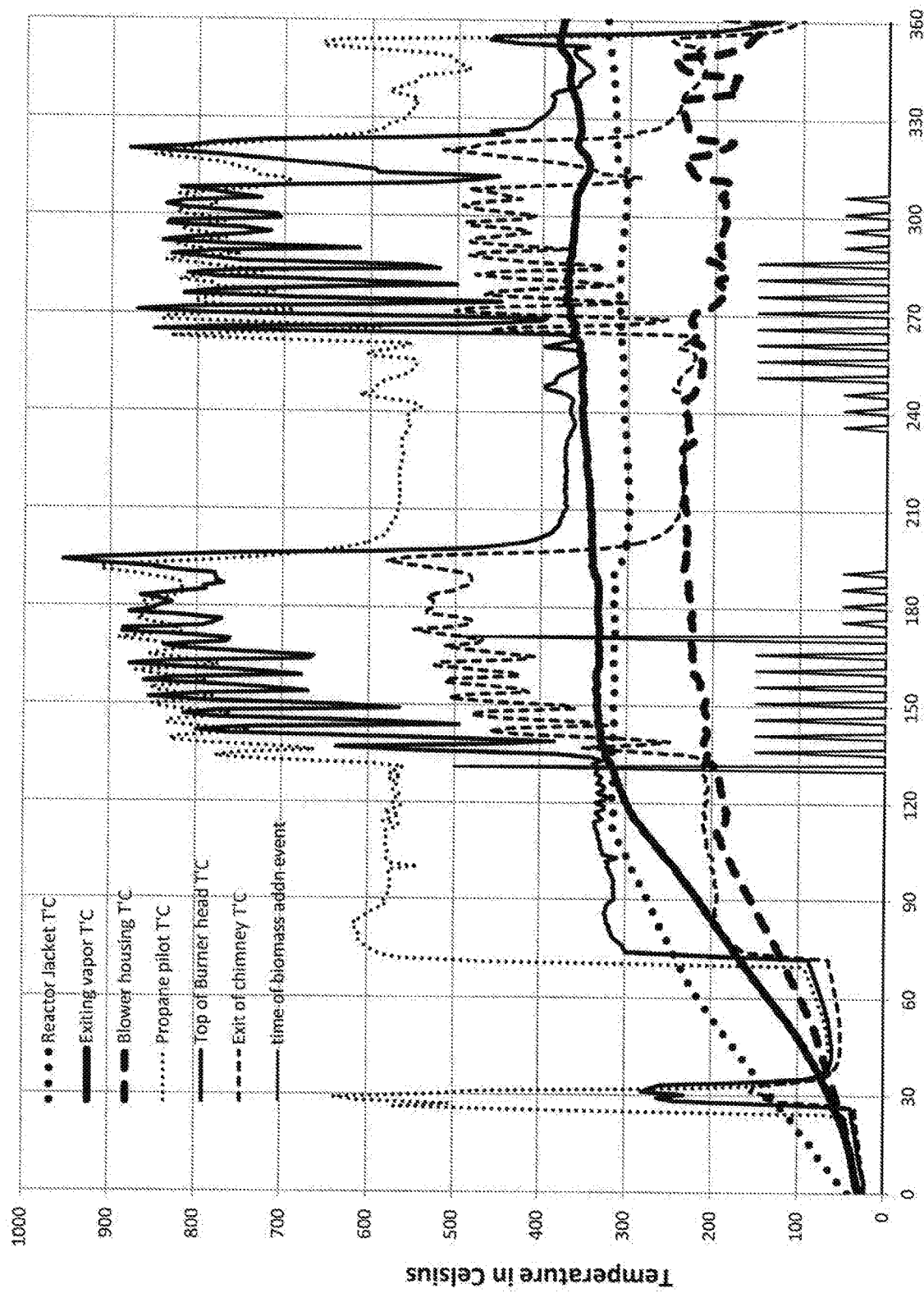
Figure 2: Time in minutes from onset of heating 300-gallon reactor

METHOD OF INCREASING ADSORPTION IN BIOCHAR BY CONTROLLED OXIDATION

CROSS-REFERENCE TO RELATED APPLICATION

This application is a continuation of and claims priority to PCT/US U.S. Ser. No. 14/56724, filed on Sep. 22, 2014, which itself claimed priority of Provisional Application 61/882,241, filed on Sep. 25, 2013.

This invention relates to applications for biochar, specifically to methods that result in the improvement of adsorption, greater processing flexibility, and lower temperatures in operating production equipment.

BACKGROUND

Thermally modified biomass, often known as charcoal, biochar or simply "char" is a class of materials characterized by microporous networks of amorphous graphitic carbon, are naturally occurring as a residue of forest fires. These chars are created out of the living plant matter by the simple heating of the biomass to above 300 degrees Celsius.

The heating process transforms the biomass by thermally decomposing the existing organic chemical bonds, resulting in the generation of gases known as pyrolysis gas or "wood gas", and consolidating the remaining solids into a more carbon-rich form known as char. In the presence of oxygen, typically from air, two additional phenomena are prevalent; vapor phase luminous combustion of the pyrolysis gases and surface oxidation of the residual solids to generate carbon monoxide, referred to as "char gas".

Luminous combustion is characterized by yellow and blue flames, removed from the solid surface, since it is the discharge of pyrolysis gases from the solid biomass that are mixing and reacting with the oxygen in the vapor space above the solid to create the flame, with the heat radiating back to the solid biomass to heat it and generate additional pyrolysis gases.

Char gas is produced by a subsequent reaction available to carbon-rich char once it is formed. In char gasification, molecular oxygen migrates to the solid surface of the char and reacts with the carbon therein to form carbon monoxide, generating sufficient heat to maintain the solid surface at the characteristic red glow of char as it is gasified. The carbon monoxide leaves the surface as a gas and can participate in additional vapor-phase oxidation to generate more heat and form carbon dioxide. The combustion of carbon monoxide is characterized by a predominately blue flame, devoid of the yellow flames characteristic of pyrolysis gas combustion.

While char can be formed by natural causes like by lightning strike-initiated forest fires, another common form of char is charcoal, a man-made fuel. Charcoal burns hotter and generates less smoke than wood and other biomass, and can also act as a chemical reluctant in the production of metals from mineral ores. In the production of charcoal, the conditions are optimized to facilitate the heating of the biomass, which drives off the pyrolysis gases and converts the biomass to char, and inhibiting the char gasification reactions. By preserving the char once it is formed, the yield of charcoal is maximized. As such, whereas char is a coincidental residue of forest fires, it is the objective of charcoal production. As such, the prior art is rich with mechanical devices and processing methods to enhance charcoal purity, fuel value and yield.

In charcoal production, the purity and fuel value of the char are paramount; in the current invention another char property, adsorption, is prioritized. Adsorption focuses on the ability of solid adsorbents to remove organic molecules from liquid and vapor phases. The best known example of this phenomenon is activated carbon, which is widely used to purify contaminated water and air streams.

Activated carbon, as commercially manufactured, is optimized for the adsorption property. The production consists of making a char, the carbon-rich precursor, typically from coal, nut shells or wood, and then performing a specific production step known as "activation", where the porosity and adsorbing property of the activated carbon is increased. The activation step involves either thermal activation at temperatures above 750 degrees Celsius in an atmosphere containing water vapor or carbon dioxide or chemical activation, where chemicals such as phosphoric acid, caustic or ferric chloride are added to promote conversion to the activated product at lower temperatures than thermal activation.

Biochar, a non-activated product, has a level of intrinsic adsorption capacity depending on the conditions of production of the char. The focus of this invention is methods developed to increase the adsorption capacity of chars, without requiring a separate activation process.

In the case of activated carbon, adsorption is the paramount property and the prior art is dominated by methods to enhance adsorption and yield of the final activated carbon product. This prior art focuses on the conditions of the activation step, which follows the creation of the intermediate material, the char. The dominant char properties are mechanical strength, carbon purity and density, and char yield from a given amount of starting coal or biomass, with the intrinsic char adsorption characteristics being a secondary consideration.

Biochar is the term typically used for charcoal-like materials used in agricultural applications. When incorporated into growing systems, the fuel value of the char is not relevant, whereas the adsorption capacity plays an important role. Since biochar shares the property of adsorption with activated carbons, there are applications where biochars possessing sufficient adsorption capacity can be substituted for activated carbons.

SUMMARY

This invention involves the application of controlled conditions of temperature and oxygen level inside a closed vessel to a class of materials often referred to as charcoal, biocarbon, biochar or simply "char". The methods, comprising a set of techniques to affect controlled oxidation of the chars, result in the improvement of the adsorption capacity of the char and the operation of the char production process at lower temperatures and with greater operational flexibility.

The methods involve providing an environment for the char that controls the temperature and oxygen level such that desired oxidation reactions occur within the char while vapor space luminous combustion is avoided. By controlling the duration, the relative portions of biomass and char, and the ambient conditions within the vessel, the desired benefits of this invention can be realized. In the absence of vapor space luminous combustion, there is a range of oxygen concentrations that allow molecular oxygen to diffuse into the char and initiate the reactions that modify the properties of the char in the intended manner of this invention.

Luminous combustion is avoided by controlling the level of oxygen in the processing environment such that the level present remains below the minimum or limiting oxygen concentration for vapor phase combustion. Since the char present in the vessel is removing oxygen via reactions occurring within the solids, the control of the vapor oxygen level is achieved by regulating the supply of oxygen introduction into the vessel over time.

The oxygen that diffuses into the solids participates in oxidation reactions that generate heat and raise the temperature of the solids within the reactor. As such, temperature control requires options for removing thermal energy. In implementations of the invention, several methods are utilized; removal of heat by conduction through the reactor walls, removal of heat by introducing colder vapor and removing a similar volume of hotter vapors, or providing solids within the reactor that can incorporate additional thermal energy as latent or specific heat.

If the rate of heat generation is greater than the rate of heat removal, the temperature of the vessel and its contents increase, and vice versa. In this invention, any biomass present in the reactor, prior to conversion to char, provides additional mechanisms for being a heat sinks; the evaporation of residual moisture and the creation and evaporation of the pyrolysis gases created during the conversion of biomass to char.

As demonstrated in the examples to follow, the heat generated by the oxidation reactions in the char can be used to promote the conversion of biomass to char, with the concurrent generation of pyrolysis gas that can be removed from the reactor. The harvested pyrolysis gas can be utilized either as a fuel source or a source of the chemical compounds present in the pyrolysis gas.

In practice and in all the examples presented, the control of the temperature was achieved by balancing the rate of heat generation from oxidation reactions occurring within the char with the conductive heat loss through the vessel walls, uptake of specific heat by solids and vapors in the vessel, and the endothermic requirements of converting any biomass present into char. Upon sufficient heating, the biomass converts to biochar, which then may or may not be further processed for enhanced adsorption capacity.

This disclosure features a method of improving the adsorption capacity of biochar, comprising providing initial biochar in a closed vessel, exposing the biochar to a processing temperature and oxygen level below that of vapor space luminous combustion, and at the same time controlling the oxygen level in a vapor space surrounding the biochar to promote oxidation reactions that generate additional heat, controlling the biochar at the processing temperature by removal of heat by conduction through the vessel walls, uptake of specific heat by solids and vapors in the vessel, and the endothermic requirements of converting any biomass present in the vessel into char, and maintaining the biochar at the processing temperature and oxygen level for sufficient duration such that the adsorption capacity of the final biochar is improved, as measured by ASTM D-5742 or the equilibrium uptake of R134a at 100 degrees Celsius.

The initial biochar provided in the closed vessel may be derived from wood. The processing temperature may be between about 250 C and about 400 C. The sufficient duration may be between one hour and three hours. The final biochar may have both higher adsorption capacity and a greater product of adsorption capacity times yield than biochars produced in an atmosphere of nitrogen at the same processing temperature and duration. The initial biochar may be blended with pyrolysis oil from previous biochar production and converted into additional biochar by controlled oxidation. The controlled oxidation of the char may be terminated by halting an induced draft fan that is used to extract vapor from the vessel and allowing the vessel to cool by heat loss to the ambient. The processing temperature may be controlled below about 400 C at least in part due to the conversion of biomass to biochar in the vessel. The processing temperature may be modulated by adding biomass to the vessel while the biochar is at the processing temperature and oxygen level. Gaseous fuel may be extracted from the vessel, and the production of gaseous fuel may be modulated by adding biomass to the vessel while the biochar is at the processing temperature and oxygen level. The processing temperature may be ramped up to between about 350 C and about 400 C and hold there for at least about for 4 hours. The processing temperature may be ramped up in stages, with one or more lower intermediate temperature ramp set points, and one or more intermediate temperature holds. The final biochar may be produced entirely in air.

Also featured is a method of improving the adsorption capacity of biochar, comprising providing initial biochar in a closed vessel, exposing the biochar to a processing temperature and oxygen level below that of vapor space luminous combustion, and at the same time controlling the oxygen level in a vapor space surrounding the biochar to promote oxidation reactions that generate additional heat, controlling the biochar at the processing temperature of between about 250 C and about 400 C by removal of heat by conduction through the vessel walls, uptake of specific heat by solids and vapors in the vessel, and the endothermic requirements of converting any biomass present in the vessel into char, and maintaining the biochar at the processing temperature and oxygen level for between one hours and three hours such that the adsorption capacity of the final biochar is improved, as measured by ASTM D-5742 or the equilibrium uptake of R134a at 100 degrees Celsius, wherein the final biochar has both higher adsorption capacity and a greater product of adsorption capacity times yield than biochars produced in an atmosphere of nitrogen at the same processing temperature and duration.

The controlled oxidation of the char may be terminated by halting an induced draft fan that is used to extract vapor from the vessel and allowing the vessel to cool by heat loss to the ambient. The processing temperature may be controlled at least in part due to the conversion of biomass to biochar in the vessel. The processing temperature may be modulated by adding biomass to the vessel while the biochar is at the processing temperature and oxygen level. Gaseous fuel may be extracted from the vessel, and the production of the gaseous fuel is modulated by adding biomass to the vessel while the biochar is at the processing temperature and oxygen level. The processing temperature may be ramped up in stages, with one or more lower intermediate temperature ramp set points, and one or more intermediate temperature holds. The final biochar may be produced entirely in air.

BRIEF DESCRIPTION OF THE DRAWINGS

FIG. 1 is a schematic diagram of a system that may be used to practice the methods herein.

FIG. 2 illustrates aspects of an example herein.

DETAILED DESCRIPTION OF THE PREFERRED EMBODIMENTS

FIG. 1 is a schematic diagram of a biochar processing system 10 that can be used to accomplish methods disclosed herein. System 10 includes closed vessel or reactor 12 into which the initial biochar 14 is charged. Tube 16 is passed through end 18 of vessel 12 to allow for air inlet. Means such as a motor and associated drive and support bearings (not shown) can be used to rotate vessel 12 about its longitudinal axis at a desired rate. The biomass can be heated by any appropriate means as would be apparent to one skilled in the art, and/or as disclosed herein. In some cases an extraction fan (not shown) is used to draw air through reactor 12, instead of tube 16. Other biochar processing systems could be used to accomplish the methods, as would be apparent to one skilled in the art.

Example 1

Improving the Adsorption Capacity of a Low Temperature Biochar

Adsorption is the property whereby microporous materials, including biocarbons and activated carbons, selectively remove organic compounds from both liquid and vapor phases and retain the adsorbed materials within the internal voids of the adsorbent. The process involves the transfer of the adsorbates from the bulk phase to the interior of the adsorbent and is characterized by the release of the heat of adsorption, a weight gain by the adsorbent by the amount of adsorbate retained and no significant swelling of the solid adsorbent. Measuring adsorption involves providing an adsorbable "challenge gas" and measuring the amount of material taken up by the adsorbent. Typically, the extent of uptake is determined gravimetrically, by weighing the adsorbent before and after allowing exposure to the challenge gas. One routine measure of adsorption is ASTM D-5742, where the weight gain of dry activated carbon is measured when exposed to a stream of pure n-butane at 1 atmosphere pressure and room temperature. In this discussion, the adsorption capacity will be quantified by the equilibrium weight gain of the dry char when exposed to a stream of pure R134a (1,1,1,2-tetrafluoroethane), a common automotive refrigerant, at 100 Celsius. The measured value of R134a adsorption capacity is quantitatively similar to the Butane Activity measured by ASTM D-5742 and either test method can be used to quantify the phenomenon discussed in this and subsequent examples.

Typical biochars produced by the oxygen-free pyrolysis of low-ash biomass exhibit an adsorption capacity that is strongly dependent on the heat treatment temperature (HTT), the highest treatment temperature the biomass experiences during the pyrolytic conversion to biocarbon. In general, biochar adsorption is minimal when produced at a I-HTT was below 300 Celsius, reaches a maximum when the HTT was between 500 and 700 Celsius, and decreases at higher temperatures, as discussed in a paper presented at the USBI 2010 Biochar Conference at Iowa State University titled "Schenkel and Shenxue Revisited" and available at www.acfox.com/SchenkelandShenxueRevisited.pdf and elsewhere on the internet. The highest adsorption capacity reported in that paper was 6.5 wt % uptake of R134a at 100 Celsius, measured on a biochar produced at 600 Celsius in a nitrogen sweep, and yielding 27 wt % biocarbon per unit of initial dry biomass.

The starting material for this example was pyrolyzed sawdust, obtained from a third party and the base material was produced at a HTT of approximately 350 Celsius. The initial char measured an Adsorption Capacity (gm R134a per gram dry char at 100 Celsius) of 2.03%. Identical samples of approximately 170 grams of pyrolyzed sawdust were treated according to the conditions shown in Table 1 in a 4.4-liter rotary reactor, consisting of a non-pressurized horizontal SS cylinder, 7" diameter by 7" height, with vapor injected in one end and exiting the reactor at the opposite end. The reactor was externally heated, rotated at 0.6 rpm and had two 1" high internal flights to prevent slippage of the contents along the reactor walls. The key features of the laboratory-scale rotary reactor are shown in FIG. 1.

The vapor purge rate of approximately 0.5 empty bed volumes per minute (BV/min) consisted of either air or nitrogen, with one case of no vapor purge. The reactor was ramped uniformly to the temperature set point over 1 hour, and then held at that temperature for 1 to 3 hours, as indicated in Table 1.

TABLE 1

|  | vapor | HTT | YIELD | Ads Capacity | Ads-yield |
|---|---|---|---|---|---|
| Pyrolyzed Sawdust - as recd | n/a | 350 | 100.0% | 2.03% | 203 |
| Ramp to 325 C., hold 3 hrs | none | 333 | 91.3% | 1.61% | 147 |
| Ramp to 325 C., hold 3 hrs | N2 | 333 | 85.7% | 1.93% | 165 |
| Ramp to 250 C., hold 3 hrs | air | 254 | 87.5% | 2.99% | 262 |
| Ramp to 325 C., hold 1 hour | air | 335 | 84.5% | 2.60% | 220 |
| Ramp to 325 C., hold 2 hrs | air | 335 | 79.4% | 4.49% | 356 |
| Ramp to 325 C., hold 3 hrs | air | 331 | 75.1% | 6.17% | 463 |
| Ramp to 400 C., hold 3 hrs | air | 409 | 70.0% | 7.36% | 515 |
| Improvement: (400 C./as recd) |  |  |  | 3.63 | 2.54 |

There are several trends of interest in Table 1, but the overarching trend is the decrease of the adsorption capacity in the cases of no vapor purge or purging with nitrogen, and the pronounced increase when the vapor phase is air. Within the examples using air as the purge vapor, there is a progressive improvement in adsorption capacity with increasing temperature and duration of treatment. Table 1 calculates an additional metric of the product of the percent yield times the percent adsorption capacity ("Ads-yield"), which provides a quantification of the impact of the treatment of an initial amount of low-adsorbing biocarbons. For the best example of the improvement, being the case of treatment at 400 Celsius for three hours in air, the yield decreased to 70% of the initial char mass, but the adsorption capacity improved by a factor of 3.63, for an improvement in "adsorption-yield" of a factor of 2.54.

Example 2

Improving the Adsorption Capacity of Lump Charcoal and TLUD Biochar

There are two commonly accessible sources of chars and they possess different properties as produced. Lump charcoal is a staple fuel used for cooking in most of the world and a boutique fuel for barbequing in developed countries. Cooking charcoal usually contains significant volatiles, in order to light easily, and provides a hot smokeless source of heat. In contrast, Top-Lit UpDraft (TLUD) micro-gasifier cooking stoves do not require charcoal as fuel, but rather use uncarbonized biomass as fuel and convert the biomass into char in the course of gasifying the biomass to make heat for cooking. The chars in both cases are potentially widely available, but do not typically exhibit good adsorption capacity. This example demonstrates the ability of the controlled oxidation, using ambient air as the source of oxygen, to improve the adsorption capacity of both these materials.

Cowboy Charcoal, a popular brand of cooking charcoal, was purchased at a local hardware store and used for the lump charcoal sample. The charcoal fines between $\frac{1}{8}^{th}$ and 1 inch were collected and used for the study. The TLUD char was made in a natural draft 1 gallon TLUD, using a design available on the web and known as the "1G Toucan TLUD" (http://www.stoves.bioenergylists.org/mclauglintoucan). The TLUD runs were performed in duplicate, using dry wood pellets as fuel and each run lasting about 75 minutes. Table 2 does not show a HTT for TLUD chars because the TLUD has a descending pyrolysis front that is hot, but difficult to accurately measure the temperature and likely not constant throughout the biomass. The char samples were then treated by controlled oxidation in the 4.4-liter reactor detailed in Example 1 for the conditions shown in Table 2.

TABLE 2

|  | vapor | HTT | YIELD | Ads Capacity | Ads-yield |
|---|---|---|---|---|---|
| Cowboy Charcoal - as recd |  | as recd | 100.0% | 0.88% | 88.0 |
| Ramp to 380 C., hold 4.5 hrs | air | 380 | 78.8% | 3.68% | 290.1 |
| Cowboy improvement |  |  |  | 4.18 | 3.30 |
| TLUD I - wood pellets as charred |  | tlud | 20.7% | 2.16% | 44.6 |
| Ramp to 325 C., hold 3 hrs | air | 325 | 20.6% | 3.82% | 78.8 |
| TLUD I improvement |  |  |  | 1.77 | 1.76 |
| TLUD II - wood pellets as charred |  | tlud | 20.9% | 1.98% | 41.4 |
| Ramp to 380 C., hold 4.5 hrs | air | 380 | 19.9% | 7.89% | 156.8 |
| TLUD II improvement |  |  |  | 3.98 | 3.79 |

The trends in Table 2 are similar to the trends observed in Table 1, demonstrating that the adsorption capacity and adsorption yield of both lump charcoal and TLUD chars are improved by controlled oxidation in air. It is noteworthy that the TLUD chars showed very little yield loss during the controlled oxidation, attributed to the high temperatures encountered during the TLUD pyrolysis removing any volatile compounds, yet exhibited a dramatic improvement in adsorption capacity when subjected to controlled oxidation conditions.

Example 3

Improving the Operational Flexibility of Slow Pyrolysis Biocarbons Processes

One of the current drawbacks to the production of adsorbing biochars using slow pyrolysis methods is the exacting conditions that produce elevated adsorption capacities. As discussed in Example 1, the preferred temperatures for creating adsorptive biocarbons using a slow pyrolysis process is 500 to 700 Celsius and the yields are often below 30 wt % of char per unit of dry initial biomass. This example demonstrates the ability of controlled oxidation to upgrade slow pyrolysis chars created under a wide variety of conditions to high adsorption capacity materials. This flexibility removes the requirements of operating slow pyrolysis processes within narrow operating conditions in order to create adsorbing biochars.

Char A consisted of a low temperature char, created at a HTT of 275 Celsius in an atmosphere of inert nitrogen gas. The char was made in the reactors detailed in U.S. Pat. No. 7,199,069 in Column 9, lines 45-61 and designated R-1 and R-2. Reactor R-1, based on an externally heated 11 inch long piece of 3" NPT Schedule 40 carbon steel pipe, was filled with 700 grams of dried wood pellets and ramped to 275 Celsius over 1 hour, then held at the HTT for 45 minutes. Nitrogen gas purged the reactor at 0.1 BV/min through the entire slow pyrolysis processing. The resulting char, designated Char A, was treated with two cycles of controlled oxidation in the 4.4-liter reactor detailed in Example 1 for the conditions shown in Table 3, creating Char A1 and Char A2. An additional sample of Char A was pyrolized in the 1.25" NPT reactor R-2 to a HTT of 400 C under a nitrogen gas purge of 0.75 BV/min, as detailed in Table 3.

Char series B was made in the same sequence of conditions as Char series A except the HTT for Char B was 350 Celsius and the HTT was approached over a slower temperature gradient over 7 hours. Char C was made in the same sequence of conditions as Char A except the HTT for Char C was 300 Celsius. For reasons that will be discussed, Char C was then combined with the pyrolysis oil collected above 250 Celsius during the pyrolysis of Char C, representing approximately one half the total pyrolysis oil generated and about one half the mass of Char C. Subsequently, Char C1 was subjected to the conditions shown in Table 3.

TABLE 3

|  | vapor | HTT | YIELD | Ads Capacity | Ads-yield |
|---|---|---|---|---|---|
| Char A: Ramp to 275 C. in N2, hold 0.75 hrs | N2 | 275 | 63.2% | 0.68% | 42.9 |
| Char A1: Ramp Char A to 350 C. in air, hold 3 hrs | air | 350 | 43.4% | 4.30% | 186.4 |
| Char A2: Ramp Char A1 to 400 C. in air, hold 3 hrs | air | 400 | 31.9% | 8.01% | 255.5 |
| Char A-N2: Ramp Char A to 400 C. to N2, hold 3 hrs | N2 | 400 | 36.8% | 2.28% | 83.8 |
| Char A improvement (air/N2 at 400 C.) |  |  |  | 3.51 | 3.05 |
| Char B: Slower ramp to 350 C. in N2, hold 1 hour | N2 | 350 | 42.9% | 1.56% | 66.8 |
| Char B1: Ramp Char B to 350 C. in air, hold 3 hrs | air | 350 | 39.2% | 4.84% | 189.9 |
| Char B2: Ramp Char B1 to 400 C. in air, hold 3 hrs | air | 400 | 30.4% | 8.23% | 250.5 |
| Char B-N2: Ramp Char B to 400 C. in N2, hold 3 hrs | N2 | 400 | 38.0% | 2.15% | 81.7 |
| Char B improvement (air/N2 at 400 C.) |  |  |  | 3.83 | 3.07 |
| Char C: Ramp to 300 C. in N2, hold 2.5 hrs | N2 | 300 | 45.1% | 1.51% | 68.0 |
| Char C1: Char C with pyrolysis oil added | N2 | 300 | 45.1% | 1.45% | 65.3 |
| Char C2: Ramp Char C1 to 380 C. in air, hold 3 hrs | air | 380 | 40.1% | 5.04% | 202.1 |
| Char C3: Ramp Char C2 to 400 C. in air, hold 3 hrs | air | 400 | 31.0% | 7.80% | 241.4 |
| Char C-N2: Ramp Char C1 to 400 C. in N2, hold 3 hrs | N2 | 400 | 36.4% | 2.73% | 99.4 |
| Char C improvement (air/N2 at 400 C.) |  |  |  | 2.86 | 2.43 |

The experiments reported in Table 3 represent a wide spectrum of initial conditions to create the initial pyrolized chars, from torrefied wood at 275 Celsius to low temperature char at 350 Celsius. This example also includes a case where pyrolysis oil has intentionally been added back to the slow pyrolysis char, and demonstrates the ability of controlled oxidation to impart improved adsorption capacity in a char saturated with volatiles. This later technique may prove a useful method of utilizing pyrolysis oils, with the energy content of the pyrolysis oils being realized during subsequent controlled oxidation of the char-pyrolysis oil combination.

The data of Table 3 reports on three separate experiments that produced biochars with similar enhanced adsorption capacity at the end of different sequences of pyrolysis and controlled oxidation conditions. In each case, the final biocchar is compared to the same char produced under the same conditions, except nitrogen gas has replaced air in the controlled oxidation processing steps. This demonstrates that a wide variety of pyrolysis processes can be used to generate initial chars, which can be subsequently upgraded with controlled oxidation to produce biochars with elevated adsorption capacities. This also implies that a given pyrolysis process can be operated over a wide range of conditions and all the resulting chars can be improved with controlled oxidation. An additional expectation, based on the variations in the three initial chars (A, B & C), the similarity of controlled oxidation treatment and similarity of adsorption capacity of the finished biocarbons (A2, B2 & C3), is that mixtures of different low adsorbing chars can be combined and upgraded together in a composite controlled oxidation process with the appropriate adjustment of time and temperature of treatment. This phenomenon has important implications for distributed production of char, such as with TLUD-style improved cookstoves, where the initial char pool is created in small quantities under variable conditions. The results of this example predict that such a mixture of initial chars can be upgraded to highly adsorbing biochar by a single combined treatment of controlled oxidation.

Example 4

Utilizing Operational Flexibility in a Lower Temperature Biocarbon Process

This example involves operating a pilot-scale version of an "AC FOX" reactor (www.adsorbentsolutions.com and www.acbfox.com) and in a manner that utilizes the operational flexibility implied in the earlier examples and demonstrates the ability of controlled oxidation conditions to produce biochars with elevated adsorption capacities using operating temperatures significantly lower than current slow pyrolysis methods. AC FOX reactors are currently being used commercially to regenerate spent activated carbon and represent a proven and available reactor configuration that can be used to accomplish methods discussed herein.

The reactor used for this example is a 300-gallon externally-heated batch rotary reactor that rotates at 0.5 rpm, and has 4 internal flights that extend 4 inches high in a reactor diameter of 36 inches. The 300-gallon AC FOX reactor shares many of the same features and operational capabilities as the 4.4-liter reactor detailed in Example 1. The only significant difference is the ability to sample the reactor contents, and add additional biomass into or remove char from the reactor via an auger while the reactor is operating. The vapor in the reactor is extracted by an induced draft fan and directed to an air pollution control capability that combusts the exiting vapors using a flare assisted by supplemental propane fuel. The vapor removed in the reactor is replaced by air that is admitted at the opposite end of the reactor, with the amount of replacement air being controlled by restricting, but not sealing, the air entrance. As such, the reactor vapor space has oxygen present at all times, but at lower concentrations than ambient air because of the reactions of the oxygen with the char inside the reactor.

To produce Char D1, the reactor was filled with about 50 gallons of wood chips from tree pruning and dried to reduce the residual moisture to an estimated 25 wt %. The reactor was heated by a gradual temperature ramp over three hours to an external set point of 300 Celsius without any restriction on the reactor air entrance. When the exiting vapor reached 250 Celsius, the exiting vapors supported combustion without supplemental propane fuel. Upon attaining sustained combustion of the exiting vapors, the air entrance was restricted to provide less air. The exiting vapor temperature continued to rise to the HTT of 340, at which time the batch was sampled and labeled Char D1.

After obtaining sample Char D1, the reactor was operated for 2.5 hours with the external set point at 300 Celsius and the internal exiting temperature being recorded by a datalogger. The air entrance remained covered, but a steady but reduced stream of air infiltrated the reactor during the period. The exiting vapor temperature rose to 360 Celsius and then gradually declined over the subsequent two hours to 340 Celsius. Initially, the exiting vapor sustained combustion, but over time and as the exiting temperature dropped below 350 Celsius, supplemental propane fuel was necessary to assure flame stability and complete combustion of the exiting vapors. Sample Char D2 was obtained at the end of this operating phase.

After obtaining sample Char D2, an additional 30 gallons of damp wood chips were added to the reactor while continuing the 300 Celsius external temperature set point. The exiting vapor temperature rapidly declined to 240 Celsius during the addition of the additional wood chips and the exiting vapors exhibited lower fuel value, requiring additional fuel to combust, and elevated levels of water vapor, as evidenced by the formation of steam plumes when the vapors cooled following combustion. The batch was not sampled at the end of the wood chip addition, since the material in the reactor consisted of a mixture of previously formed Char D2 and newly introduced wood chips.

After the additional wood chips were added, the reactor exiting vapor temperature slowly rose and repeated the phenomena encountered during the creation of sample Char D1, including the self-sustaining combustion of the exiting vapors at temperatures above 250 Celsius. At the end of an additional three hours, sample D4 was obtained and the induced draft fan was stopped. The effect of stopping the induced draft fan was to halt the infiltration of additional air into the reactor and resulted in the atmosphere in the reactor becoming depleted of oxygen, thereby stopping the controlled oxidation reactions. Subsequently, the reactor was allowed to cool to ambient conditions.

After four days, the cooled contents of the reactor were mixed and sampled to yield sample Char D5. The reactor was then heated to the 300 Celsius external temperature set point over 2.5 hours and held at this set point for an additional 1.5 hours. The reactor was then sampled without stopping the reactor by auguring out char into a pail and sealing the pail to allow the char to cool to yield sample Char D6.

After obtaining sample Char D6, an additional 23 gallons of damp hammer-milled wood chips, with 29 wt % moisture, were added to the reactor while continuing the 300 Celsius external temperature set point. The exiting vapor temperature rapidly declined to 220 Celsius and the sequence of phenomena exhibited previously after sample Char D2 was repeated.

After the second additional wood chips were added, the reactor exiting vapor temperature slowly rose and repeated the phenomena encountered during the creation of sample Char D4. At the end of an additional 3.5 hours, sample D8 was obtained and the induced draft fan was stopped and the reactor was allowed to cool to ambient conditions.

The conditions of this example are summarized in Table 4, with the lowest temperatures observed after the addition of damp biomass noted as Chars D3 and D7.

TABLE 4

| | vapor | HTT | Ads Capacity |
|---|---|---|---|
| Char D1: Ramp to 300 C. in air over 3 hrs | air | 340 | 4.56% |
| Char D2: Soak Char D1 at 300 C. in air for 3 hrs | air | 360 | 8.11% |
| Char D3: Add wood chips, bed temp drops to 240 C. | air | 240 | n/a |
| Char D4: Reheat D3 in air to 300 C. over 3 hours | air | 360 | 5.65% |
| Char D5: Cooled D4 to ambient, mix and sample | air | n/a | 5.48% |
| Char D6: Reheat D5 in air to 300 C. over 3 hours | air | 325 | 9.96% |
| Char D7: Add wood chips, bed temp drops to 220 C. | air | 220 | n/a |
| Char D8: Reheat D7 in air to 300 C. over 3.5 hours | air | 335 | 5.30% |

Example 4 highlights the dynamic nature of pyrolyzing biomass in the current AC FOX reactor design and the ability to influence the rate of conversion by controlling the external heat input, the amount of air admitted in the reactor, and the blend of partially pyrolized biomass in the reactor. This example also demonstrates that using the AC FOX reactor as a versatile platform to control the course of the pyrolysis while allowing the conversion of all resulting chars to materials with elevated adsorption properties. Furthermore, as demonstrated in this example, the highest necessary temperatures throughout the conversion from initial biomass to adsorptive biocarbons are below 400 Celsius, which is significantly lower than the 500 to 700 Celsius usually required to achieve elevated adsorption capacities in biocarbons.

Example 5

Converting Biomass to Adsorbing Biochars at Lower Setpoint Temperatures

This example involves the direct conversion of biomass into biochar with superior adsorption properties and higher yields than traditionally achieved in pyrolysis processes where air is excluded. In addition, the operating temperatures are lower when the atmosphere has a controlled level of oxygen present than analogous conditions without oxygen, as represented by blanketing the pyrolyzing solids with pure nitrogen.

A total of five biochars were made using identical starting material, consisting of commercially available premium wood pellets, and identical reaction conditions except for the variations in external temperature surrounding the reactor and the purge gas, being either air or pure nitrogen. The reactor was the unit described in Example 1 and operated in the same manner. In each case, 300 grams of wood pellets were used and thermally converted to biochar over a five-hour period, consisting of one hour of linear ramp from starting temperature to the setpoint temperature and four hours of maintenance at the setpoint temperature. The conditions and measured char properties are summarized in Table 5. Char E3 in Table 5 consisted of a one-half hour ramp to 325 C, 2-hour hold at 325 C setpoint, then a second one-half hour ramp to 400 C and a final 2-hour hold.

TABLE 5

| | vapor | Setpoint Temp C. | YIELD | Ads Capacity | Ads-yield |
|---|---|---|---|---|---|
| Char E1: 1 hr ramp to 350 C., hold 4 hrs | air | 350 | 37.9% | 4.64% | 175.9 |
| Char E2: 1 hr ramp to 400 C., hold 4 hrs | air | 400 | 29.2% | 7.61% | 222.2 |
| Char E3: ½ hr camp to 325 C., then 400 C. | air | 400 | 34.7% | 6.62% | 229.7 |
| Char E4: 1 hr ramp to 400 C., hold 4 hrs | N2 | 400 | 53.1% | 1.10% | 58.4 |
| Char E5: 1 hr ramp to 450 C., hold 4 hrs | N2 | 450 | 35.6% | 2.25% | 80.1 |

Several advantages of the presence of oxygen in the reactor vapor are evident in Table 5. Comparing the Char E1 to Char E5, a higher yield and adsorption capacity was achieved at one-hundred degrees Celsius lower setpoint temperature. It should be noted that the external setpoint temperature was not the actual constant temperature inside the reactor, since the reactor interior atmosphere was cooler due to the continual injection of ambient temperature vapors and heat losses through the ends of the rotating reactor. Thus, the wood pellets experienced a combination of temperatures oscillating between the wall temperature and the lower internal vapor temperature. The effect of the oxygen in the atmosphere was to induce additional heat generation within the wood pellet, resulting in the air atmosphere runs having higher thermal histories than nitrogen runs under similar setpoint temperatures, and resulting in higher conversions, as indicated by the lower yields at the same temperatures. In order to achieve similar conversions in the nitrogen atmosphere, higher setpoint temperatures were necessary. In addition to the improved thermal efficiency of the air atmosphere runs, the resulting adsorption capacity was increased to levels significantly above those achieved by the nitrogen atmosphere runs. Thus, biomass has been converted directly into biochar with superior adsorption properties at lower setpoint temperatures when the atmosphere contains oxygen as compared with nitrogen blanket conditions.

Example 6

Control Options for Operating as a Biomass-to-Biochar Gasifier

This example involves operating the pilot-scale AC FOX reactor used in Example 4 in a manner that creates a controlled stream of combustible gas exiting the reactor and demonstrates the flexibility in acceptable fuels and multiple options for controlling the rate of gaseous fuel generation. The 300-gallon reactor was fitted with a simple flare to combust the gaseous fuel from the reactor with a propane pilot ignition source and a concentrated combustion zone, followed by entrainment of secondary combustion air supplied in an annulus at the top of the burner head. There were thermocouples immediately above the propane pilot, just above the introduction of the additional combustion air at the top of the burner head, and after three feet of insulated ductwork, near the exit of the chimney.

The propane pilot consumed 0.7 pounds per hour of propane and held the propane pilot thermocouple between 550 and 600 Celsius. With an induced draft fan extracting vapor from the reactor and directing the vapor to the flare, and in the absence of additional heat release due to combustibles in the vapor from the 300-gallon reactor, the thermocouple at the top of the burner head is held about 300 Celsius and the exit of the chimney at about 200 Celsius. As will be seen, all three temperatures in the flare assembly elevate when the vapors from the reactor contain combustibles and incremental heat is generated upon combustion of the additional gaseous fuel. The propane pilot was initiated 74 minutes into the run, during the pre-heating of the reactor, and operated at steady-state until 352 minutes into the 6-hour run.

The run of Example 6 was begun with the reactor containing a partial load of biochar, which was sampled prior to the run and measured an adsorption capacity of 3.89%. Indirect resistive heating was used to bring the 300-gallon reactor and contents to the desired operating temperature, with a PID controller uniformly increasing the reactor exterior temperature to a setpoint of 312 Celsius. During the first two hours, a total of 28 kwh was required to raise the exiting vapor temperature to 300 Celsius, with an additional 4.5 kwh being required to maintain the reactor jacket at the setpoint over the next 70 minutes. After 190 minutes, the supplemental heaters were turned off and the exothermic oxidation reactions within the reactor were sufficient to maintain the reactor within the desired temperature operating range. Previous studies had demonstrated that in excess of 5 kwh per hour of power are necessary to maintain the reactor above 300 Celsius in the absence of internal oxidation reactions, demonstrating that the controlled oxidation reactions inside the 300-gallon reactor are sufficient to provide the ongoing heat duty associated with heat losses to the ambient and any additional heat duty to heat the entering air and vaporize any volatile compounds within the pyrolyzing biomass.

At 130 minutes, with the induced draft fan operating at an intermediate setting on a variable speed controller, a series of feed additions was initiated every 5 minutes for a period of 60 minutes. Wood pellets were fed for the first 9 additions, introducing a total of 20 pounds of dry wood pellets, followed by four additions of 1.5 pounds of damp wood chips, which contained roughly ⅓ water by weight. In less than five minutes, the reactor began generating combustible gas and the temperatures of all three thermocouples in the flare elevated over the baseline conditions, stabilizing several hundred degrees Centigrade hotter than the pre-feed baseline. Upon halting the periodic feed additions, the rate of vapor generation subsided and the flare temperatures returned to near or slightly above the baseline conditions.

After 45 minutes, during which the reactor maintained stable operation and temperatures without supplemental heating, a second series of feed additions was commenced. The second feed sequence, at five minute intervals, consisted of three additions of 1.5 pounds of damp wood chips, followed by 20 pounds of wood pellets in eight equal aliquots, followed by 4 additions of 1.5 pounds of damp wood chips.

The pattern of gas generation was similar to the first feed campaign, except the onset of the higher temperatures in the flare did not occur during the addition of the damp wood chips. Upon commencing the addition of dry wood pellets, the earlier pattern of flare temperature increases was observed. A number of methods for controlling the rate of gas generation and the equilibrium temperature of the reactor jacket and exiting vapor were utilized, including reducing the speed of the induced draft fan, restricting the inlet of the feed auger to limit air infiltration, and adjusting the rotational speed of the 300-gallon reactor.

FIG. 2 shows the temperatures over the six-hour period from the onset of heating the reactor to the quelling of the reactor conditions after the termination of the second feed addition. A char sample taken just prior to terminating the run measured an adsorption capacity of 5.59%.

In practice, the biomass in the AC FOX reactor is elevated in temperature by external heating until the oxidation reactions of the vapor phase oxygen with the reactor solids generate sufficient heat to sustain the temperature of the reactor contents. At that time, the temperature is managed by removing heat through the reactor walls and controlling the level of oxygen in the reactor. Over time, the solid material evolves by losing volatiles and forming a microporous graphite-rich structure that exhibits the elevated adsorption properties described. At that time, finished adsorbent can be removed from the reactor and additional biomass added, as desired.

While the above description and examples contain many specificities, these should not be construed as limitations on the scope of the invention, but rather as an exemplification of one of the preferred embodiment thereof. Many other variations are possible, generally resulting from the application of accepted engineering principles to specific requirements of the application. Accordingly, the scope of the invention should be determined not by the embodiments illustrated, but by the appended claims and their legal equivalents.

What is claimed is:

1. A method of improving the adsorption capacity of biochar, comprising:
providing initial biochar in a closed vessel that includes an air inlet and a vapor output, wherein the initial biochar consists essentially of wood that has been pyrolyzed to above 300C;
processing the biochar by controlling a processing temperature inside the vessel to between 250C and 400C, and at the same time controlling an oxygen level inside the vessel such that luminous combustion of pyrolysis gases in a vapor space inside the vessel surrounding the biochar are absent, while the oxygen level in the vapor space inside the vessel surrounding the biochar is sufficient to promote oxidation reactions that generate heat;
maintaining the controlled processing temperature inside the vessel at least in part by adding biomass to the vessel and converting the added biomass into char; and
maintaining the controlled oxygen level inside the vessel by removing vapors from the vessel through the vapor outlet and thereby controlling the influx of air into the vessel through the air inlet;
wherein the controlled processing temperature and the controlled oxygen level are maintained for sufficient duration such that the adsorption capacity of the final processed biochar is improved, as compared to that of the initial biochar, by at least 28%, as measured by ASTM D-5742 or the equilibrium uptake of R134a at 100 degrees Celsius.

2. The method of claim 1 wherein the adsorption capacity of the final biochar is improved by at least 300%.

3. The method of claim 1 wherein the adsorption capacity of the final biochar is improved, as compared to the same initial biochar processed at the same temperature and for the same amount of time, by at least 200%.

4. The method of claim 1 wherein the sufficient duration is between one hour and three hours.

5. The method of claim 1 wherein the final biochar has both higher adsorption capacity and a greater product of adsorption capacity times yield than a biochar produced from the same initial biochar in an atmosphere of nitrogen at the same processing temperature and duration.

6. The method of claim 5 wherein the product of adsorption capacity times yield of the final biochar as compared to a biochar produced from the same initial biochar in an atmosphere of nitrogen at the same processing temperature and duration is increased by at least 200%.

7. The method of claim 6 wherein the product of adsorption capacity times yield of the final biochar as compared to a biochar produced from the same initial biochar in an atmosphere of nitrogen at the same processing temperature and duration is increased by from 243% to 307%.

8. The method of claim 5 wherein the adsorption capacity of the final biochar is improved, as compared to the same initial biochar processed at the same temperature and for the same amount of time, by at least 200% and the product of adsorption capacity times yield of the final biochar as compared to a biochar produced from the same initial biochar in an atmosphere of nitrogen at the same processing temperature and duration is increased by at least 200%.

9. The method of claim 1 wherein the initial biochar is blended with pyrolysis oil from previous biochar production and converted into additional biochar by controlled oxidation.

10. The method of claim 1 wherein gaseous fuel is extracted from the vessel, and wherein the production of gaseous fuel is modulated by adding biomass to the vessel while the biochar is at the processing temperature and oxygen level.

11. The method of claim 1 wherein the processing temperature is ramped up to between 350C and 400C and held there for at least about for 4 hours.

12. The method of claim 1 wherein the processing temperature is ramped up in stages, with one or more lower intermediate temperature ramp set points, and one or more intermediate temperature holds.

13. The method of claim 1 wherein air is the only source of oxygen in the vessel.

14. The method of claim 1 wherein the adsorption capacity of the final biochar is improved, as compared to the same initial biochar processed at the same temperature and for the same amount of time, by from 286% to 383%.

15. The method of claim 1 wherein the controlled oxidation of the biochar is terminated by halting an induced draft fan that is used to extract vapor from the vessel and draw air into the vessel and allowing the vessel to cool by heat loss to the ambient.

16. A method of improving the adsorption capacity of biochar, comprising:
providing initial biochar in a closed vessel that includes an air inlet and a vapor output, wherein the initial biochar consists essentially of wood that has been pyrolyzed to above 300C;
processing the biochar by controlling a processing temperature inside the vessel to between 250C and 400C, and at the same time controlling an oxygen level inside the vessel, wherein the only source of oxygen is air, such that luminous combustion of pyrolysis gases in a vapor space inside the vessel surrounding the biochar are absent, while the oxygen level in the vapor space inside the vessel surrounding the biochar is sufficient to promote oxidation reactions that generate heat;
maintaining the controlled processing temperature inside the vessel at least in part by adding wood to the vessel and converting the added wood into char; and
maintaining the controlled oxygen level inside the vessel by removing vapors from the vessel through the vapor outlet and thereby controlling the influx of air into the vessel through the air inlet;
wherein the controlled processing temperature and the controlled oxygen level are maintained for sufficient duration such that the adsorption capacity of the final processed biochar is improved, as compared to that of the initial biochar, by at least 200%, as measured by ASTM D-5742 or the equilibrium uptake of R134a at 100 degrees Celsius, and the product of adsorption capacity times yield of the final processed biochar as compared to a biochar produced from the same initial biochar in an atmosphere of nitrogen at the same processing temperature and duration is increased by at least 200%.

17. A method of improving the adsorption capacity of biochar, comprising:
creating an initial biochar that consists essentially of wood that has been pyrolyzed to above 300C;
loading the initial biochar in a closed vessel that includes an air inlet and a vapor output;
processing the biochar by controlling a processing temperature inside the vessel to between 250C and 400C, and at the same time controlling an oxygen level inside the vessel such that luminous combustion of pyrolysis gases in a vapor space inside the vessel surrounding the biochar are absent, while the oxygen level in the vapor space inside the vessel surrounding the biochar is sufficient to promote oxidation reactions that generate heat;
maintaining the controlled processing temperature inside the vessel at least in part by adding biomass to the vessel and converting the added biomass into char; and
maintaining the controlled oxygen level inside the vessel by removing vapors from the vessel through the vapor outlet and thereby controlling the influx of air into the vessel through the air inlet;
wherein the controlled processing temperature and the controlled oxygen level are maintained for sufficient duration such that the adsorption capacity of the final processed biochar is improved as compared to that of the initial biochar.

* * * * *